US012577982B2

(12) United States Patent
Chou et al.

(10) Patent No.: US 12,577,982 B2
(45) Date of Patent: Mar. 17, 2026

(54) UNIVERSAL JOINT TO SUPPORT AND ROTATE ELECTRONIC PRODUCT WITH STABLE STRUCTURE

(71) Applicant: LANTO ELECTRONIC LIMITED, Kunshan City (CN)

(72) Inventors: Chiawei Chou, Kunshan City (CN); Changsing Chu, Kunshan City (CN)

(73) Assignee: LANTO ELECTRONIC LIMITED, Kunshan City (CN)

( * ) Notice: Subject to any disclaimer, the term of this patent is extended or adjusted under 35 U.S.C. 154(b) by 398 days.

(21) Appl. No.: 18/212,391

(22) Filed: Jun. 21, 2023

(65) Prior Publication Data

US 2024/0288031 A1 Aug. 29, 2024

(30) Foreign Application Priority Data

Feb. 23, 2023 (CN) .......................... 202320288867.6

(51) Int. Cl.
*F16C 11/06* (2006.01)
*F16C 11/08* (2006.01)
*F16M 11/14* (2006.01)
(52) U.S. Cl.
CPC ........ *F16C 11/0628* (2013.01); *F16C 11/069* (2013.01); *F16C 11/083* (2013.01); *F16M 11/14* (2013.01); *Y10T 403/32721* (2015.01)
(58) Field of Classification Search
CPC ... F16C 11/06; F16C 11/0609; F16C 11/0619; F16C 11/0623; F16C 11/0628; F16C 11/0638; F16C 11/0652; F16C 11/0657; F16C 11/069; F16C 11/083; F16C 11/086; F16M 11/14; B25B 23/0007; B25B 23/0014; B25B 23/0028; Y10T 403/32631; Y10T 403/32713; Y10T 403/32721; Y10T 403/32729; Y10T 403/32737; Y10T 403/32762; Y10T 403/32786;
(Continued)

(56) References Cited

U.S. PATENT DOCUMENTS

| 1,324,396 | A | * | 12/1919 | Heath | ................. | F16C 11/0619 |
| | | | | | | 74/579 R |
| 3,168,339 | A | * | 2/1965 | Townsend | .......... | F16C 11/0638 |
| | | | | | | 403/138 |

(Continued)

FOREIGN PATENT DOCUMENTS

| CN | 114847728 | A | | 8/2022 | | |
| GB | 1455656 | A | * | 11/1976 | .......... | F16C 11/0619 |
| KR | 20170050424 | A | * | 5/2017 | .......... | F16C 11/0619 |

*Primary Examiner* — Amber R Anderson
*Assistant Examiner* — Kevin J Baynes
(74) *Attorney, Agent, or Firm* — Birch, Stewart, Kolasch & Birch, LLP

(57) ABSTRACT

A universal joint includes a seat body, a cover body, a damping member, and an elastic member. The cover body is fixed on the seat body and the cover body and the seat body form a cavity together. The damping member and the elastic member are respectively located on opposite sides of the cavity. The elastic member is fixed on the seat body and maintained below the cover body. The damping member is fixed on the cover body and maintained above the seat body. The universal joint of the present disclosure has the beneficial effect of structural stability, avoiding the problem of insufficient clamping force or even failure.

18 Claims, 13 Drawing Sheets

(58) Field of Classification Search
CPC ..... Y10T 403/32795; Y10T 403/32803; Y10T 403/32811
USPC .............. 248/181.1, 181.2, 288.31, 481, 663
See application file for complete search history.

(56) References Cited

U.S. PATENT DOCUMENTS

| | | | | |
|---|---|---|---|---|
| 4,244,548 A * | 1/1981 | Sharp | B60R 1/06 | 403/143 |
| 4,586,216 A * | 5/1986 | Grajoszex | A22B 3/06 | 452/53 |
| 4,601,603 A * | 7/1986 | Nakayama | F16C 11/069 | 403/321 |
| 4,673,329 A * | 6/1987 | Kato | B25J 19/063 | 414/744.5 |
| 4,813,810 A * | 3/1989 | Suzuki | F16D 3/387 | 403/322.2 |
| 5,071,279 A * | 12/1991 | Rutstrom | F16M 11/14 | 403/114 |
| 5,073,417 A * | 12/1991 | Bowerman | F16M 11/14 | 428/31 |
| 5,280,871 A * | 1/1994 | Chuang | A45B 17/00 | 248/516 |
| 5,567,939 A * | 10/1996 | Hong | F16M 11/14 | 250/347 |
| 5,613,792 A * | 3/1997 | Terada | F16C 11/0657 | 403/135 |
| 5,851,151 A * | 12/1998 | Reynolds | B25B 13/06 | 464/106 |
| 5,957,445 A * | 9/1999 | Hagman | F16C 11/106 | 269/75 |
| 6,485,218 B1 * | 11/2002 | Martinovsky | B60T 13/52 | 403/135 |
| 7,219,867 B2 | 5/2007 | Kalis et al. | | |
| 7,281,693 B2 * | 10/2007 | Chou | F16M 11/242 | 403/90 |
| 7,296,771 B2 | 11/2007 | Kalis et al. | | |
| 7,467,775 B2 * | 12/2008 | Lu | F16M 13/00 | 248/676 |
| 7,475,858 B2 | 1/2009 | Kalis et al. | | |
| 7,516,928 B2 | 4/2009 | Kalis et al. | | |
| 7,784,953 B2 * | 8/2010 | Rumsey | B60R 1/04 | 359/872 |
| 8,001,873 B2 * | 8/2011 | Peng | B25B 23/0014 | 403/57 |
| 8,047,739 B2 * | 11/2011 | Sellers | F16C 11/0628 | 403/135 |
| 8,132,291 B2 * | 3/2012 | Tsai | F16C 11/106 | 16/224 |
| 8,740,161 B2 * | 6/2014 | Hsu | F16M 11/14 | 248/205.8 |
| 8,800,942 B2 * | 8/2014 | Yu | F16M 11/10 | 248/122.1 |
| 8,979,055 B2 * | 3/2015 | Chu | F16M 11/14 | 248/278.1 |
| 8,995,225 B2 * | 3/2015 | Nyholt | G01N 29/265 | 367/104 |
| 9,291,194 B2 * | 3/2016 | Strobel | F16C 11/0638 | |
| 9,557,002 B2 * | 1/2017 | Wong | F16M 11/2064 | |
| 9,709,218 B1 * | 7/2017 | Mchatet | G06F 1/1633 | |
| 10,527,087 B2 * | 1/2020 | Sugg | F16C 11/0633 | |
| 10,544,824 B2 * | 1/2020 | Sellers | F16C 11/0647 | |
| 10,544,825 B2 * | 1/2020 | Parker | F16C 11/0628 | |
| 11,326,641 B2 * | 5/2022 | Sellers | B60G 7/005 | |
| 11,504,831 B2 * | 11/2022 | McKenzie | B25B 13/465 | |
| 11,795,994 B1 * | 10/2023 | Schmidt | F16C 11/0647 | |
| 11,896,096 B2 * | 2/2024 | LeAnna | F16M 11/14 | |
| 2004/0079853 A1 * | 4/2004 | Suzuki | B60R 1/04 | 248/467 |
| 2014/0205366 A1 * | 7/2014 | Mevorach | F16C 11/0685 | 403/144 |
| 2019/0283221 A1 * | 9/2019 | Chen | B25B 23/0035 | |

* cited by examiner

UNIVERSAL JOINT TO SUPPORT AND ROTATE ELECTRONIC PRODUCT WITH STABLE STRUCTURE

CROSS-REFERENCE TO RELATED APPLICATION

This patent application claims priority of a Chinese Patent Application No. 202320288867.6, filed on Feb. 23, 2023 and titled "UNIVERSAL JOINT", the entire content of which is incorporated herein by reference.

TECHNICAL FIELD

The present disclosure relates to a field of electronic products, in particular to a universal joint.

BACKGROUND

For electronic products such as monitor devices or display devices, customers usually have requirements for changing between different angles, to adapt to changing monitor objects or changing display objects. Connection structure between an existing electronic product and a base usually uses a hinge and a rotating shaft to realize rotation. The existing connection structure has two shaft centers perpendicular to each other, so that the rotation mode between the existing electronic product and the base is single. The electronic product can only rotate horizontally around one axis relative to the base, or, the electronic product can only rotate up and down around another axis relative to the base. That is to say, the electronic product cannot rotate arbitrarily, synchronously on both the horizontal and vertical planes. Therefore, a universal joint that can be rotated arbitrarily at 360 degrees came into being. The universal joint includes a bottom base assembly and a top seat assembly that cooperate with each other. The bottom base assembly comprises a ball and the top seat assembly has a shell for accommodating the ball. The top seat assembly has an aperture formed on the shell facing away from the electronic product. The top seat assembly includes a damping member and a plurality of elastic members, all of which are positioned in the aperture to corporately receive the ball. The damping member includes a concave central portion and a plurality of flexible arms extending from the concave central portion. The elastic members are assembled and wrapped around the periphery of the flexible arms. When the universal joint initially receives the ball, the flexible arms flex outward and compress the elastic members; when the ball is fully assembled in place within the universal joint, the elastic members release elastic force, causing the flexible arms to contract inward to contact the ball. The damping member and the elastic members cooperate to retain the ball in the top seat assembly. The damping member provides frictional resistance when the ball rotates within the top seat assembly. In the top seat assembly of the existing universal joint, the flexible arms of the damping member are easily invalidated or damaged after multiple deflections, and the elastic members are easy to fall off, so that the top seat assembly and even the entire universal joint cannot be used.

SUMMARY

An object of the present disclosure is to provide a universal joint having a stable structure, avoiding the problem of insufficient clamping force or even failure.

In order to achieve the above object, the present disclosure discloses a universal joint including a seat body, a cover body, a damping member, and an elastic member. The cover body is fixed on the seat body, the cover body and the seat body form a cavity together. The damping member and the elastic member are respectively located on opposite sides of the cavity. The elastic member is fixed on the seat body and maintained below the cover body. The damping member is fixed on the cover body and maintained above the seat body.

In order to achieve the above object, the present disclosure further discloses a universal joint including a seat body, a cover body, a damping member, an elastic member, a base portion, and a ball portion. The cover body is fixed on the seat body and the ball portion is positioned on the base portion. The cover body and the seat body form a cavity together, and the damping member and the elastic member are respectively located on opposite sides of the cavity. The elastic member is fixed on the seat body and the damping member is fixed on the cover body. The seat body defines an opening from which the ball portion enters into the cavity. The damping member frictionally presses against the ball portion and the ball portion is flexibly supported to the elastic member.

In order to achieve the above object, the present disclosure further discloses a universal joint including a seat body; a cover body fixed on the seat body; a damping member; a plurality of elastic members; a base portion; and a ball portion positioned on the base portion. The cover body and the seat body form a cavity together. The damping member and the elastic members are respectively located on opposite sides of the cavity. The elastic members are fixed on the seat body and the damping member is fixed on the cover body. The seat body defines an opening from which the ball portion enters into the cavity. The damping member and the elastic members sandwich the ball portion in the cavity. The elastic members are evenly distributed around the cavity which is located above the opening.

Compared with the prior art, the damping member is clamped on the upper cover body and the elastic member is clamped on the lower seat body, i.e., the damping member and the elastic member are independent installed, the positioning and installation of the elastic member is not restricted by the damping member, which avoids failure of the elastic member caused by unstable positioning of the elastic member. The universal joint of the present disclosure has a stable structure.

DETAILED DESCRIPTION

Figure 1:
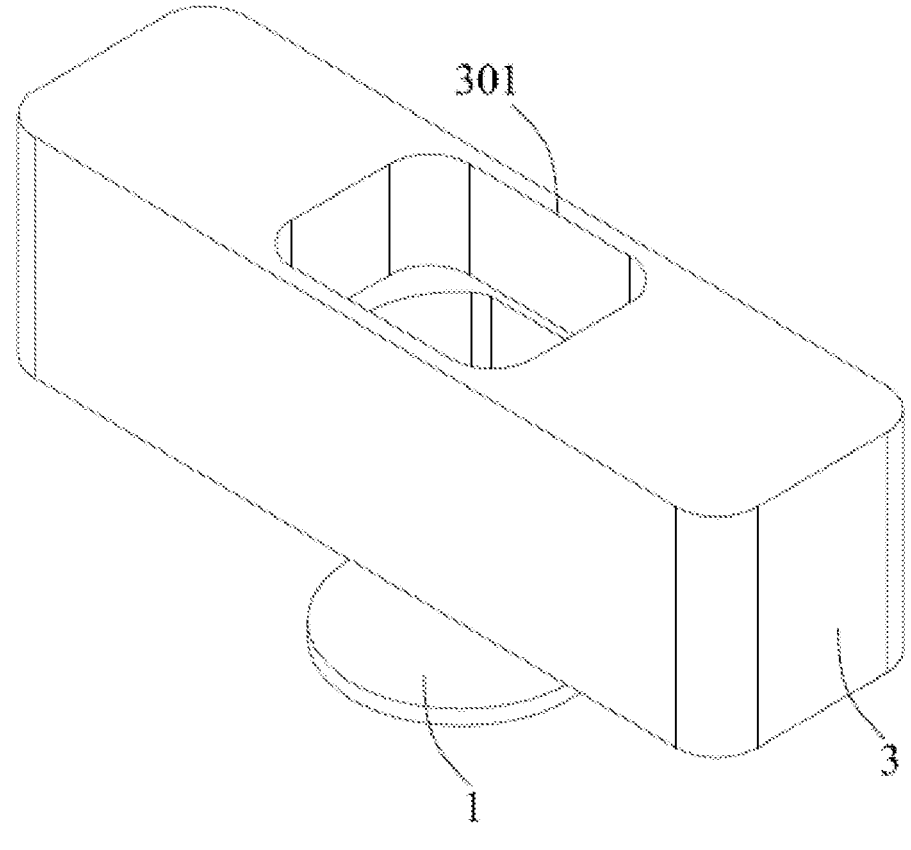
FIG. 1 is a perspective, elevational, and assembled view of a universal joint in accordance with the present disclosure.
Figure 2:
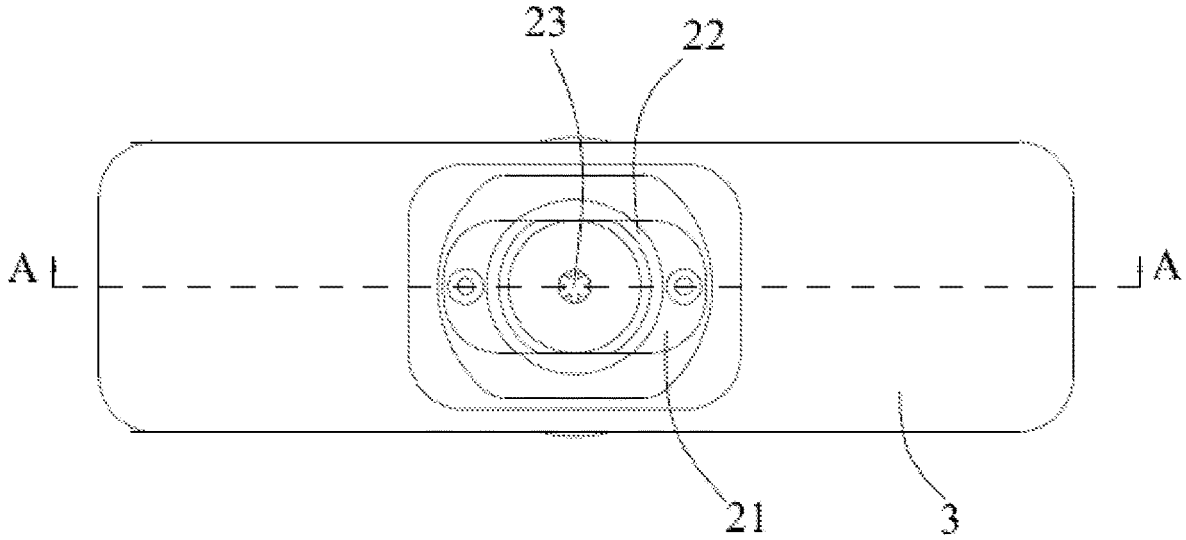
FIG. 2 is a top plane view of the universal joint in accordance with the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with the present disclosure. Rather, they are merely examples of devices and methods consistent with some aspects of the present disclosure as detailed in the appended claims.

The terminology used in the present disclosure is only for the purpose of describing particular embodiments, and is not intended to limit the present disclosure. The singular forms "a", "said", and "the" used in the present disclosure and the appended claims are also intended to include plural forms unless the context clearly indicates other meanings.

It should be understood that the terms "first", "second" and similar words used in the specification and claims of the present disclosure do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 13, the universal joint of the present disclosure is used to rotate an electronic product in omnidirectional directions. The electronic product, may be a display screen or a camera, is not shown. The universal joint of the present disclosure includes a bottom base assembly 1 and a top seat assembly 2. The creation of the universal joint of the present application focuses on the top seat assembly 2. The top seat assembly 2 includes a seat body 21, a cover body 22, a damping member 23 and an elastic member 24. The cover body 22 is fixed on the seat body 21, and accordingly, the cover body 22 and the seat body 21 form a cavity 20 together. The damping member 23 and the elastic member 24 are respectively located on opposite sides of the cavity 20. The elastic member 24 is fixed on the seat body 21 and maintained below the cover body 22. The damping member 23 is fixed on the cover body 22 and maintained above the seat body 21. Therefore, the damping member 23 and the elastic member 24 are separately and independently assembled in different parts, that is, the damping member 23 is clamped on the upper cover body 22 and the elastic member 24 is clamped on the lower seat body 21. The positioning and installation of the elastic member 24 is not restricted by the damping member 23, which avoids failure of the elastic member 24 caused by unstable positioning of the elastic member 24.

Figure 3:
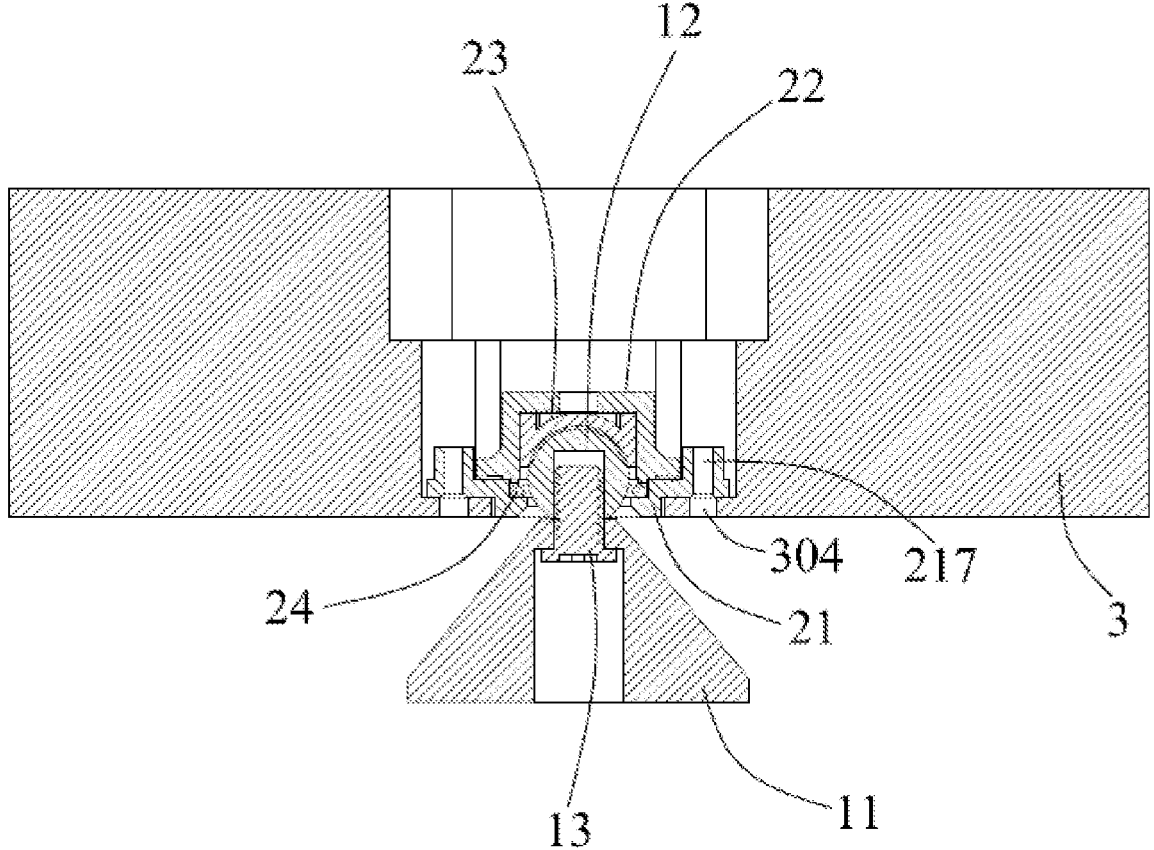
FIG. 3 is a cross-sectional view along line A-A of FIG. 2 when the universal joint is in an assembled state.
Figure 4:
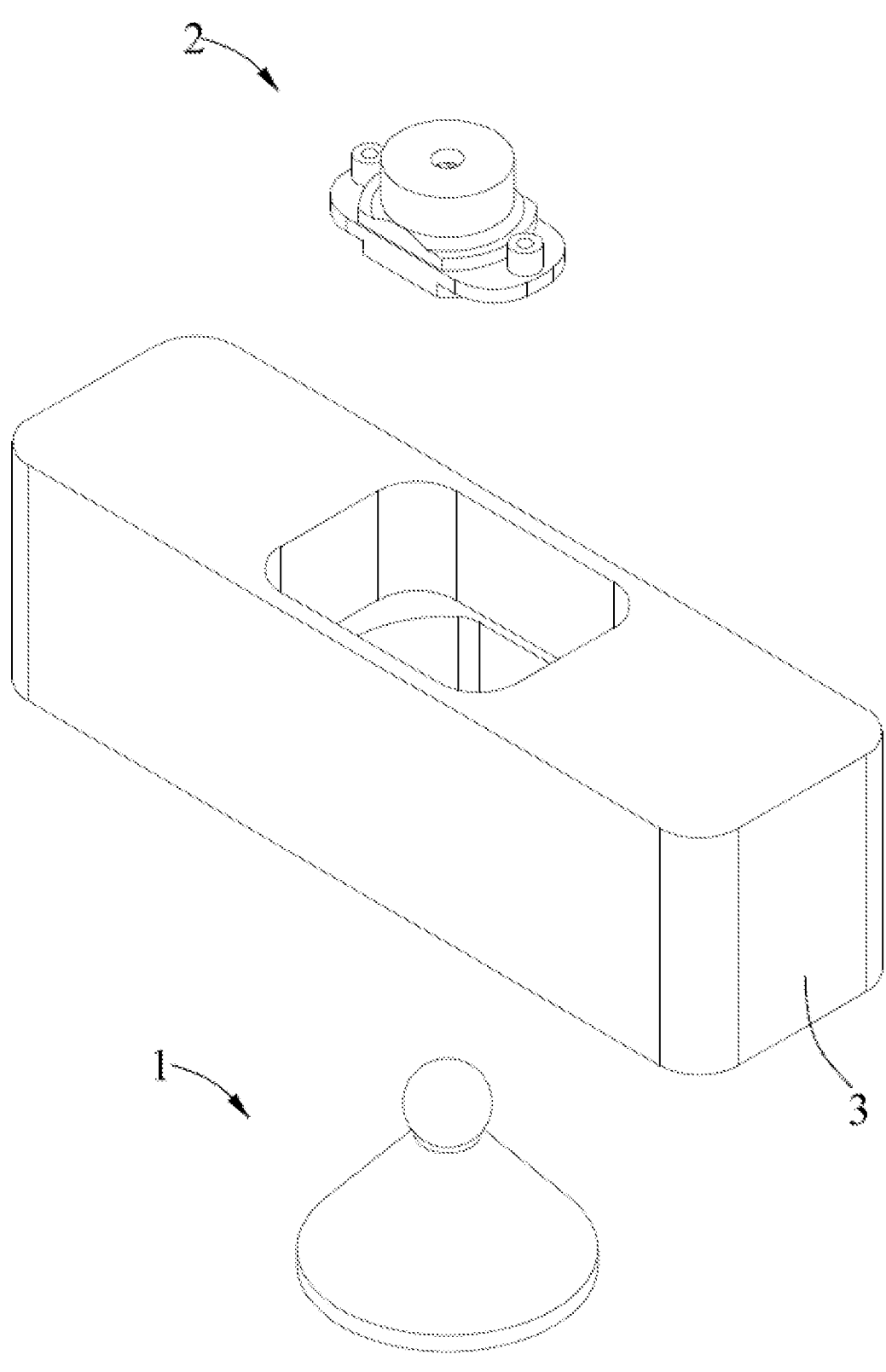
FIG. 4 is a perspective, elevational, and exploded view of the universal joint in accordance with the present disclosure.
Figure 5:
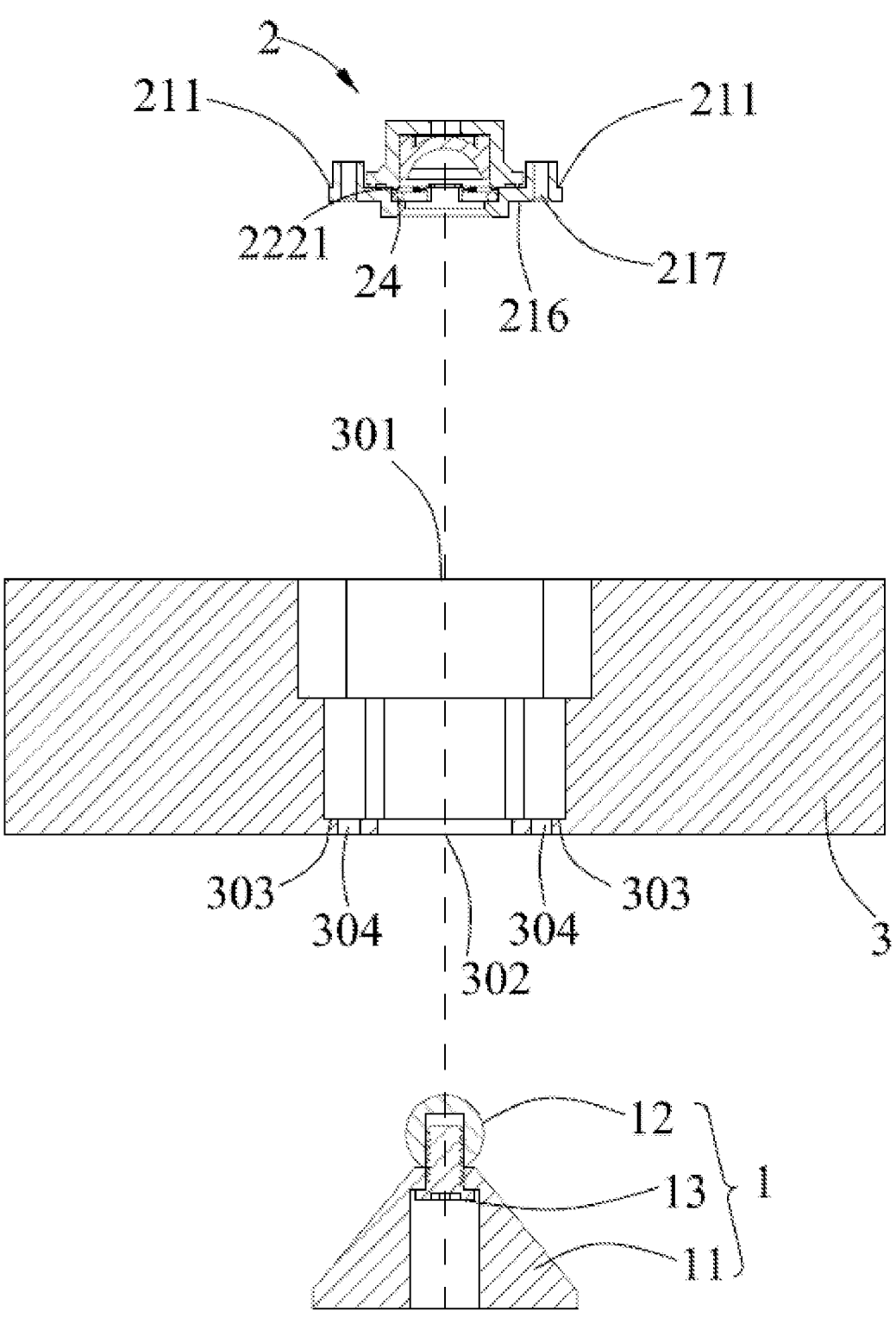
FIG. 5 is a cross-sectional view along line A-A of FIG. 2 when the universal joint is in an exploded state.
Figure 7:
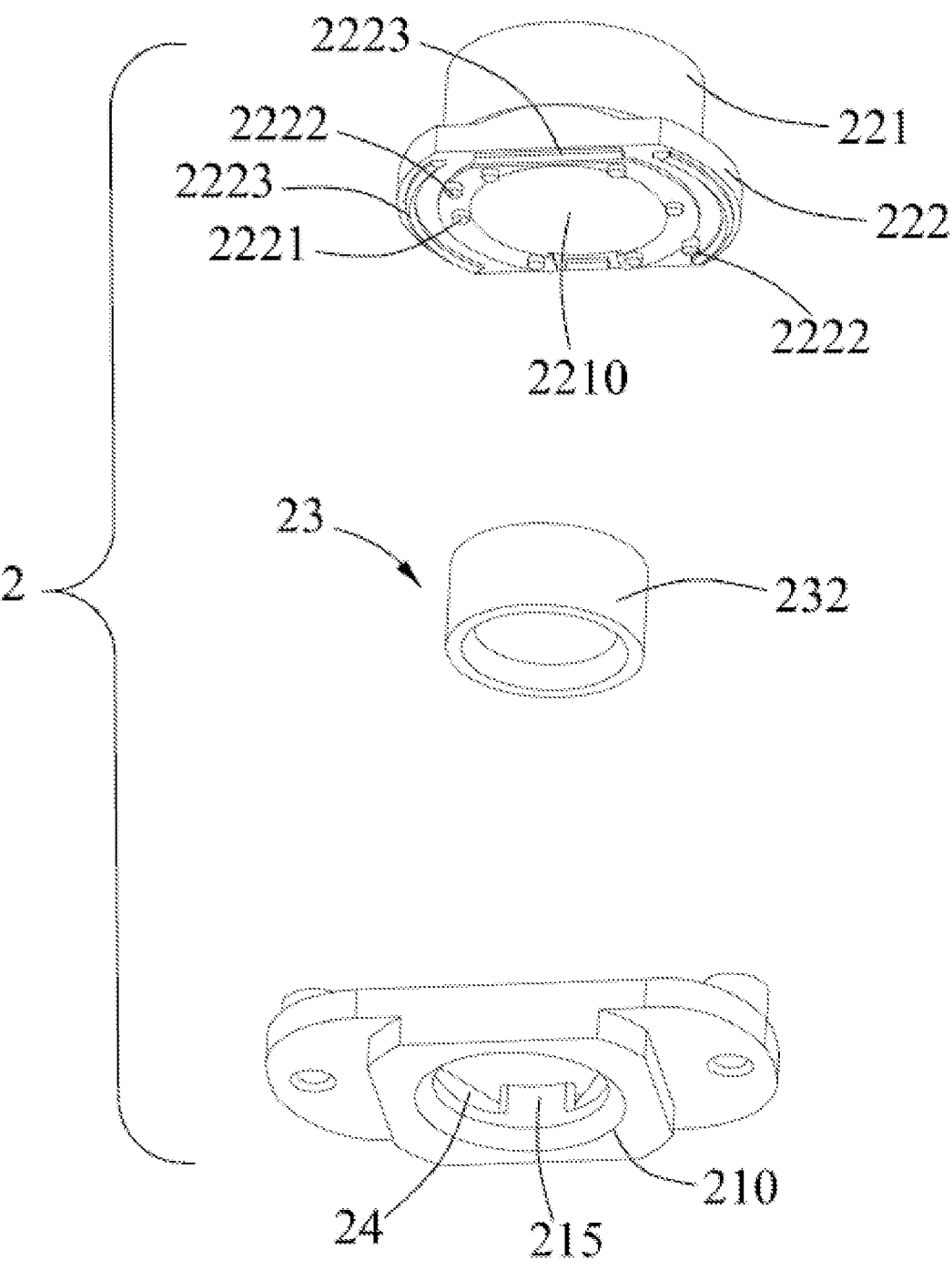
FIG. 7 is a perspective, elevational, and exploded view of the abovementioned components of FIG. 6 from another angle.

Referring to FIG. 4 and FIG. 5, in the universal joint of the present disclosure, the bottom base assembly 1 includes a base portion 11 and a ball portion 12 positioned on the base portion 11, which is well-known in the present art. The positioning method between the base portion 11 and the ball portion 12 may be a first positioning method in which the ball portion 12 is locked above the base portion 11 by a bolt 13, or a second positioning method in which the ball portion 12 is integrally formed to extend above the base portion 11. Referring to FIG. 3 and FIG. 7, the seat body 21 defines an opening 210 for the ball portion 12 to enter the cavity 20. The damping member 23 and the elastic member 24 sandwich the ball portion 12 in the cavity 20. In a preferred embodiment, the elastic member 24 is a metal spring, which interferes with the bottom of the ball portion 12 and can provide elastic supporting force to the ball portion 12. In a preferred embodiment, the damping member 23 is a rubber element that interferes with the top of the ball portion 12 to achieve a damping effect. The damping member 23 can make the electronic product which is stored in or fixed on the top seat assembly 2 rotate to any angle relative to the bottom base assembly 1 and keep it at any angle. The damping member 23 and the elastic member 24 oppositely clamp the ball portion 12 in the up-and-down direction, and so, the universal joint of the present disclosure interferes with the ball portion 12 through the damping member 23 and the elastic member 24. Therefore, the electronic product can be displayed in an omnidirectional rotation via the universal joint of the present disclosure, which has the beneficial effect of structural stability.

Figure 8:
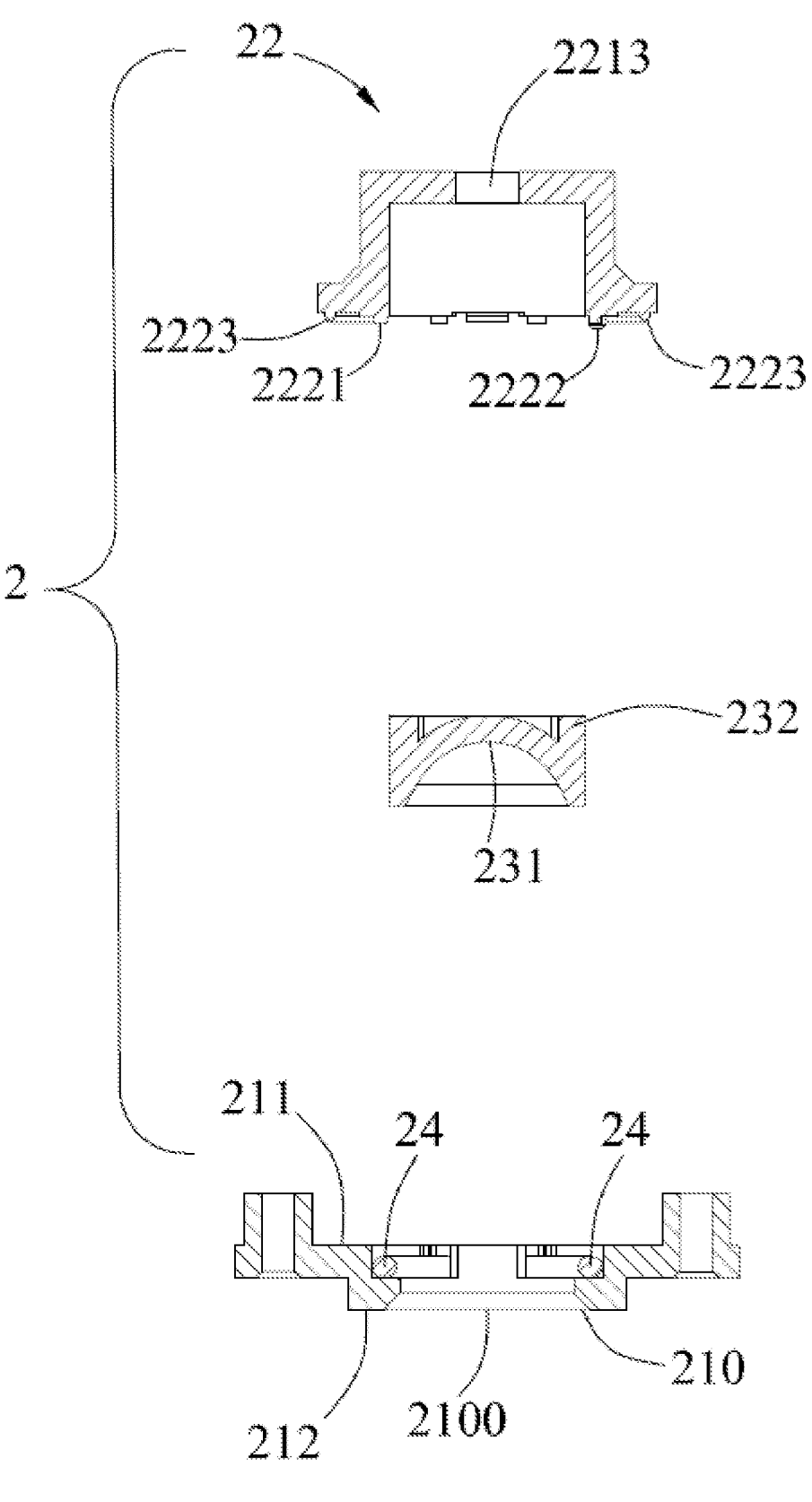
FIG. 8 is a cross-sectional view of the abovementioned components of FIG. 6 in an exploded state.
Figure 9:
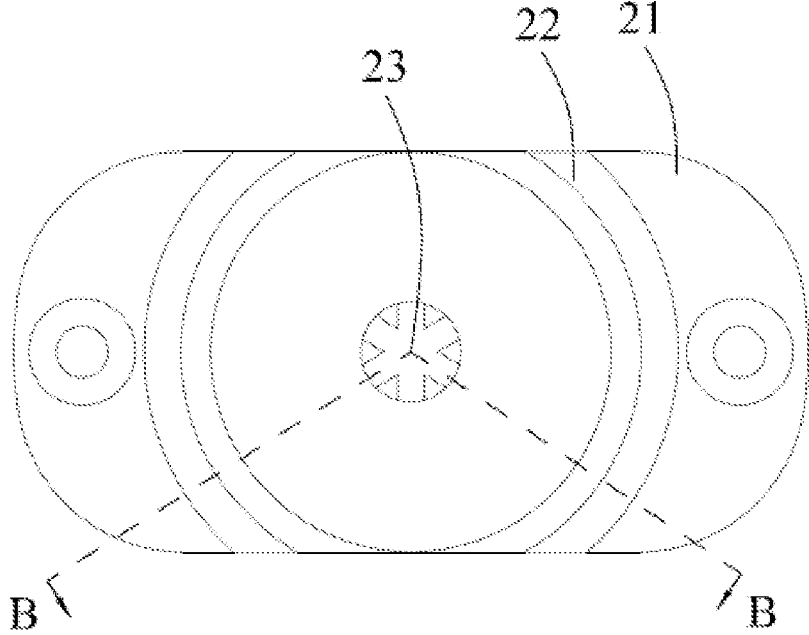
FIG. 9 is a top plane view of the abovementioned components of FIG. 6 in an assembled state.
Figure 13:
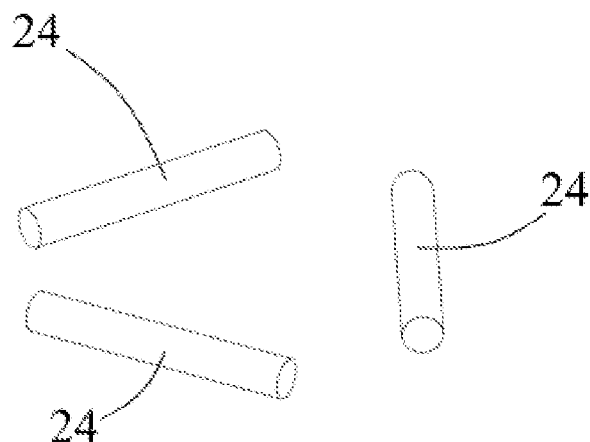
FIG. 13 is a perspective, elevational, and exploded view of both a seat body and an elastic member of the universal joint in accordance with the present disclosure.
Figure 13:
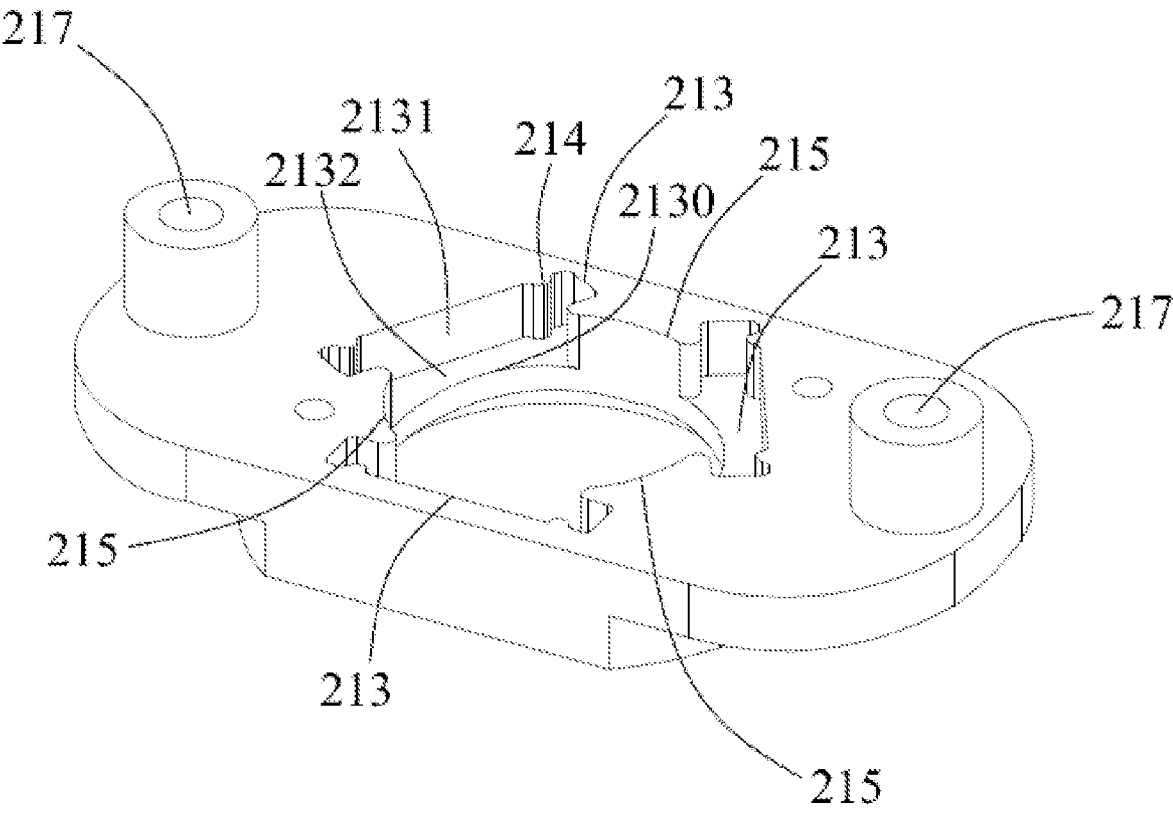

Referring to FIG. 8 and FIG. 13, the seat body 21 includes an upper surface 211 facing the cover body 22 and a lower surface 212 facing the base portion 11, that is, the upper surface 211 and the lower surface 212 are opposite to each other. The seat body 21 includes a plurality of receiving grooves 213, the receiving grooves 213 are formed by being recessed from the upper surface 211 toward the lower surface 212, each receiving groove 213 is communicated with the cavity 20, and therefore, each elastic member 24 which is located in the corresponding receiving groove 213 and is partially exposed to the cavity 20. The seat body 21 includes a side wall surface 2131 located beside each of the receiving grooves 213 and a bottom wall surface 2132 located below each of the receiving grooves 213. The bottom wall surface 2132 is horizontally connected between the upper surface 211 and the lower surface 212 and the side wall surface 2131 is vertically connected between the upper surface 211 and the bottom wall surface 2132. The receiving groove 213 includes a notched portion 2130 opposite to the side wall surface 2131. The bottom wall surface 2132 includes an inner side where the notched portion 2130 is located and an outer side where the side wall surface 2131 is located. The inner side of the bottom wall surface 2132 is curved toward the outer side of the bottom wall surface 2132, and so the bottom wall surface 2132 is shaped in a circular arc. The purpose of setting the bottom wall surface 2132 into an arc shape is to enable the elastic member 24 located in the receiving groove 213 in a natural state to be exposed in the cavity 20 through the notched portion 2130, so that the middle part of the elastic member 24 can first contact the upper hemisphere of the ball portion 12 entering the cavity 20. The more the upper hemisphere enters, the closer the middle part of the elastic member 24 is spaced to the center of the sphere. As the ball portion 12 enters the cavity 20, the ball portion 12 pushes outward against the elastic member 24 to deform, and the deformed elastic member 24 has elastic force. When the ball portion 12 is further assembled upward into the cavity 20 and after the height of the center of the ball portion 12 exceeds the installation height of the elastic member 24 in the receiving groove 213, the elastic member 24 crosses the center of the ball portion 12 from the upper hemisphere of the ball portion 12 to contact the lower hemisphere of the ball portion 12. The elastic force of the elastic member 24 is released, and the elastic member 24 supports and positions the ball portion 12 in the cavity 20. The elastic member 24 interferes with the lower hemisphere of the ball portion 12. The upward clamping force generated by the interference can also be referred to as the upward supporting force that the elastic member 24 can provide to the ball portion 12.

Figure 6:
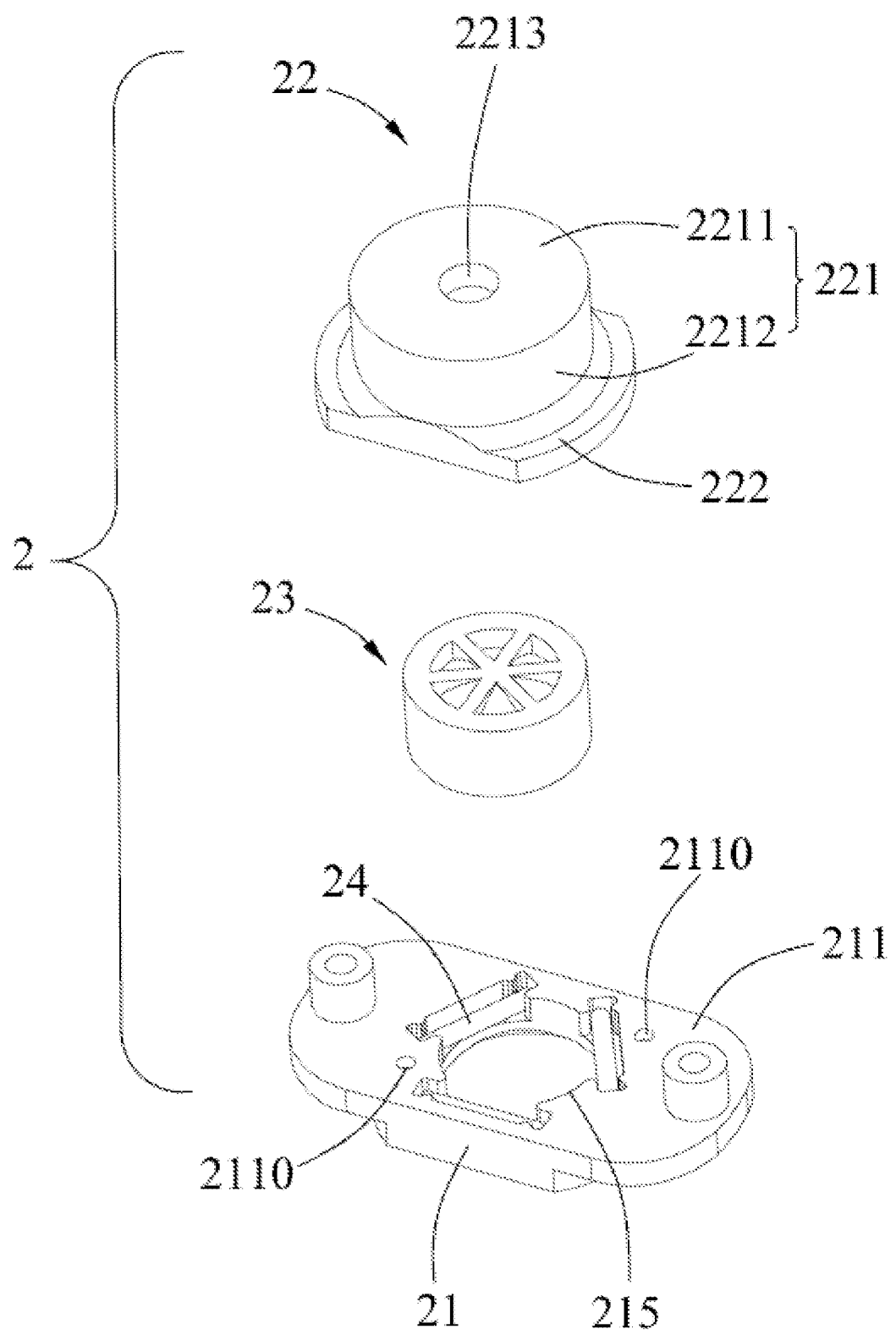
FIG. 6 is a perspective, elevational, and exploded view of some components of the universal joint in accordance with the present disclosure.

Referring to FIG. 6 and FIG. 13, the side wall surface 2131 is located beside each of the receiving grooves 213 and the side wall surface 2131 includes two rib portions 214. An avoiding space is defined between the two rib portions 214 for receiving the elastic member 24 when the elastic member 24 is deformed by the ball portion 12. In this embodiment, the opposite ends of each elastic member 24 are clamped and positioned by the wall of the seat body 21, and the middle portion of each elastic member 24 can deflect toward the side wall surface 2131 outwardly. However, it is not necessary that the opposite ends of the elastic member 24 are clamped and positioned by the wall of the seat body 21. As long as the opposite ends of the elastic member 24 can be fixed to somewhere, which makes sure that the middle of the elastic member 24 can be deflected. For example, the opposite ends of each elastic member 24 can also be hung and fixed on the seat body 21 by hooks in other embodiments.

There are three receiving grooves 213 and there are three elastic members 24 correspondingly received in the receiving grooves 213 in a specific embodiment of the present disclosure. Each elastic member 24 is a metal member (such as a metal spring). The metal property ensures the rigidity of the interference. In the present disclosure, the three receiving grooves 213 are located on a same height plane relative to the lower surface 212 where the opening 210 is located. In another saying, the three receiving grooves 213 have same depths when taken a top plane view. Therefore, the present disclosure can be regarded as: the three receiving grooves 213 are arranged in a regular triangle; or the present disclosure is called: the extension lines where the bottom wall surfaces 2132 are located form the regular triangle. The center of the regular triangle is located between the ball center 120 of the ball portion 12 and the opening center 2100 of the opening 210. Referring to FIG. 5, the center of the regular triangle, the ball center 120 of the ball portion 12 and the opening center 2100 are collinear. That is, after the ball portion 12 is assembled in place, the projection of the ball center 120 on the lower face where the opening 210 is located overlaps with the opening center 2100 of the opening 210. The center of the regular triangle is located directly below the ball center 120 of the ball portion 12, and the projection of the center of the regular triangle on the lower face where the opening 210 is located overlaps with the opening center 2100 of the opening 210. In this way, the three elastic members 24 can provide three-point balanced supporting force to the ball portion 12, ensuring the stability of clamping.

Figure 10:
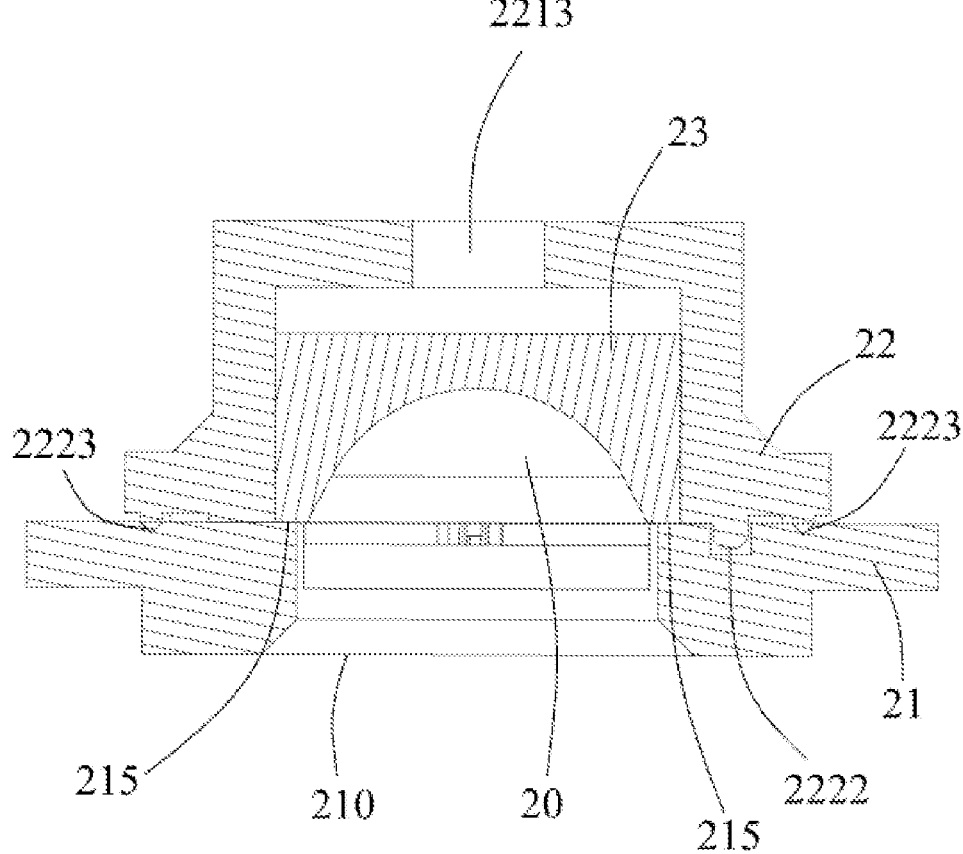
FIG. 10 is a cross-sectional view along line B-B of FIG. 9.
Figure 11:
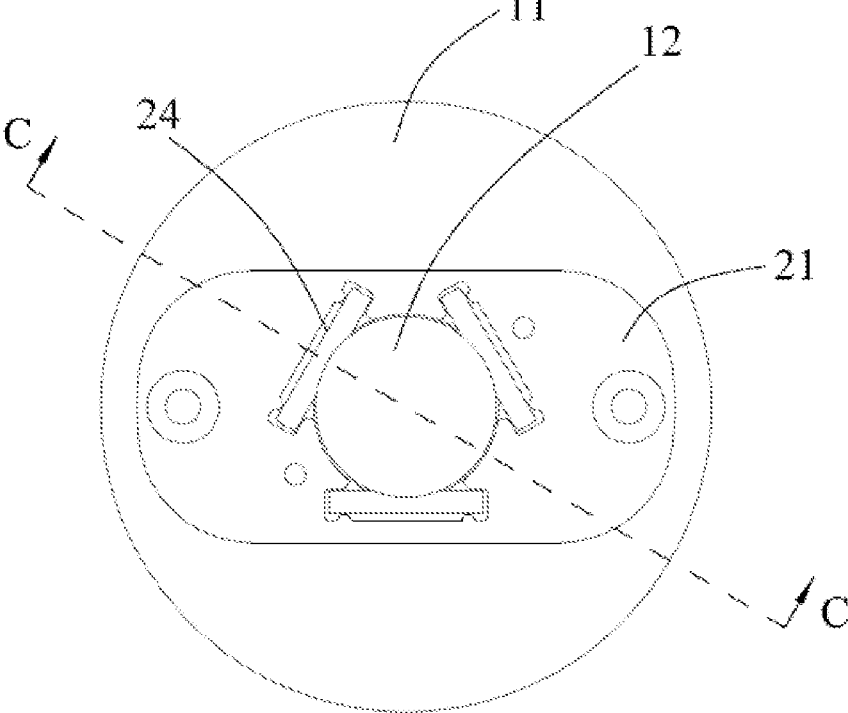
FIG. 11 is a top plane view of some other components of the universal joint in an assembled state in accordance with the present disclosure.
Figure 12:
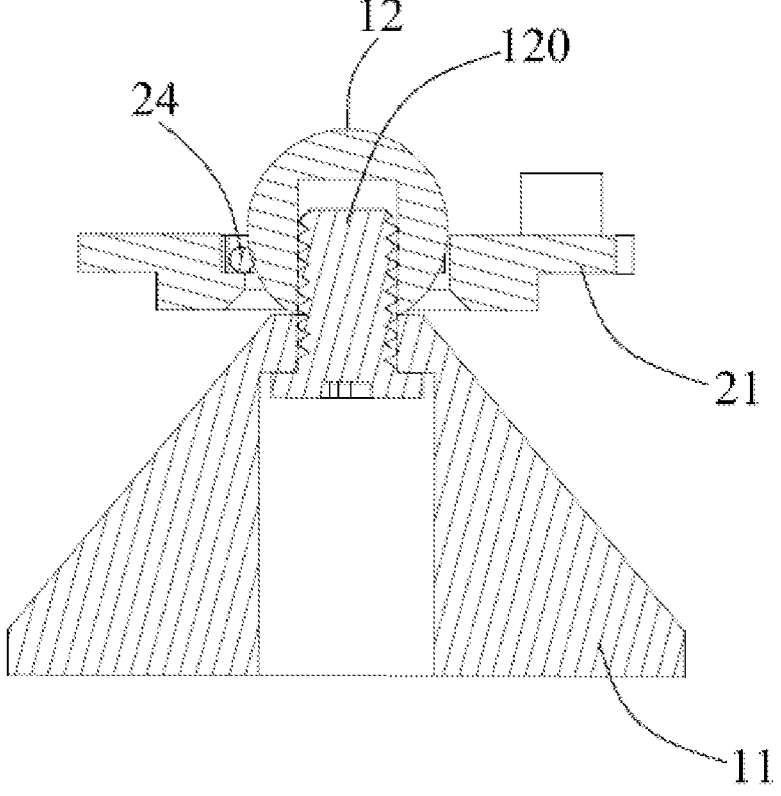
FIG. 12 is a cross-sectional view along line C-C of FIG. 11.

Referring to FIG. 6 and FIG. 13, the seat body 21 includes three dovetail-shaped raised portions 215, each of which is formed between two adjacent receiving grooves 213. Specifically, each raised portion 215 is formed between every two adjacent ends of the receiving grooves 213, that is, at the three vertices of the regular triangle. Such arrangement is beneficial to the molding of the seat body 21. It can also be understood that the raised portion 215 is naturally formed during the forming process of the opening 210 and the receiving grooves 213. The middle part of the seat body 21 is completely dug out to form both the opening 210 and a little part of the cavity 20 above the opening 210. The outer peripheral part of the opening 210 is partly dug out to form three recessed receiving grooves 213. Thereafter, the remaining parts of the seat body 21 are naturally shaped as the three raised portions 215 because of the three recessed receiving grooves 213. The reason why each raised portion 215 gets this name is relative to the receiving groove 213. Actually, an upper face of the raised portion 215 is flush with the upper surface 211 of the seat body 21. The center of the side wall of the raised portion 215 is bent into an arc shape, which is consistent with the opening 210, for matching with the surface of the ball portion 12. Each of the two sides of the raised portion 215 is used to clamp and position one of the elastic members 24. That is, the rib portions 214 provide clamping force from the outer side toward the inner side of the opposite ends of each elastic member 24 in this embodiment. The function of each raised portion 215 includes at least the following two aspects: on the one hand, it provides a clamping force from the inner side toward the outer side of the opposite ends of the elastic member 24; on the other hand, it is used to provide the pre-positioning of the ball portion 12 inside the cavity 20. Referring to FIG. 10, when the ball portion 12 has not been finally assembled into the cavity 20, the damping member 23 can contact with the raised portion 215 and so the damping member 23 is supported by the raised portion 215. Furthermore, the raised portion 215 also has a third function to prevent the damping member 23 from falling out of the cavity 20.

Referring to FIG. 5 to FIG. 8, the cover body 22 includes a hat portion 221 and a brim portion 222. The hat portion 221 rises up from the brim portion 222. The hat portion 221 includes an end opening at a bottom face thereof and the brim portion 222 extends outward from the end opening of the hat portion 221. The brim portion 222 is installed on the upper surface 211 of the seat body 21, and the brim portion 222 is extended with a plurality of stopping blocks 2221. Each stopping block 2221 correspondingly presses against the top of the elastic member 24 to prevent the elastic member 24 from jumping out of the receiving groove 213 upwardly.

Referring to FIG. 7 and FIG. 10, the brim portion 222 includes a positioning post 2222 and a positioning rib 2223. The seat body 21 includes a concaved portion 2110 facing the brim portion 222. The positioning post 2222 protrudes into the concaved portion 2110 for pre-positioning the seat body 21 and the cover body 22. The positioning rib 2223 abuts against the upper surface 211 of the seat body 21, and so, at least one of the cover body 22 and the seat body 21 can deform the positioning rib 2223 after being pressed. Laser or ultrasonic welding is performed on the deformed positioning rib 2223 for fixing the seat body 21 and the cover body 22 as a whole. The cover body 22 and the seat body 21 are clamped and fixed together by laser or ultrasonic welding, so that the damping member 23 between the cover body 22 and the seat body 21 can be connected with the ball portion 12 more tightly.

Referring to FIG. 6 to FIG. 8, the hat portion 221 includes a top wall 2211 and an annular side wall 2212. The top wall 2211 and the annular side wall 2212 enclose a receiving space 2210. The damping member 23 is a rubber element accommodated in the receiving space 2210 and the damping member 23 can be pasted on the cover body 22 with adhesive. The damping member 23 includes an arc surface 231 and an annular wall portion 232 formed on an outer periphery of the arc surface 231. The arc surface 231 is interferingly engaged with the ball portion 12. An outer surface of the annular wall portion 232 is in contact with an inner wall surface of the annular side wall 2212. An outer face of the arc surface 231 can be in contact with an inner wall face of the top wall 2211. The annular side wall 2212 of the hat portion 221 and the annular wall portion 232 of the damping member 23 can fit perfectly. After the ball portion 12 enters the cavity 20, the ball portion 12 pushes upwards the outer surface of the arc surface 231 of the damping member 23 to abut against the inner wall surface of the top wall 2211. When the damping member 23 (such as a rubber member) is clamped between the top wall 2211 and the ball portion 12, the damping member 23 interferes with the ball portion 12, so that the top seat assembly 2 can rotate to any angle relative to the bottom base assembly 1 and remain fixed.

Referring to FIG. 6, FIG. 8 and FIG. 10, the top wall 2211 includes a through hole 2213. The through hole 2213 is a hole reserved as a rework of the sample of the present disclosure. Furthermore, the through hole 2213 is an air outflow channel between the damping member 23 and the cover body 22. Therefore, the beneficial effect of the through hole 2213 is not only that the sample is easy to rework, but also that: when the ball portion 12 enters the cavity 20 and pushes the damping member 23 upwards, it is convenient for the air between the damping member 23 and the cover body 22 to flow upward smoothly.

Referring to FIG. 1 to FIG. 5, the universal joint of the present disclosure further includes a casing 3. The main function of the casing 3 is to form a storing space 30 for receiving an electronic product (such as a display screen or a camera). The storing space 30 includes a top opening 301 and a bottom opening 302. The casing 3 includes an undertaking platform 303 near the bottom opening 302 and the undertaking platform 303 includes a perforation hole 304. The top seat assembly 2 is downwardly assembled into the storing space 30 from the top opening 301, and since the lower surface 212 of the seat body 21 includes a stepped surface 216 formed by shrinking upward, the stepped surface 216 overlaps the undertaking platform 303. Furthermore, the part of the seat body 21 above the stepped surface 216 is formed with a mating hole 217, and fasteners such as bolts 13 pass through the perforation hole 304 and the mating hole 217 for fixing. After the top seat assembly 2 is assembled into the casing 3, the electronic product is stored in the casing 3. The electronic product is located above the top seat assembly 2, and the electronic product can rotate with the top seat assembly 2 relative to the ball portion 12.

Another saying, the cover body 22 and the seat body 21 form a cavity 20 together, the damping member 23 and the elastic members 24 are respectively located on opposite sides of the cavity 20, the elastic members 24 are fixed on the seat body 21 and the damping member 23 is fixed on the cover body 22, the seat body 21 defines an opening 210 for the ball portion 12 to enter the cavity 20, the damping member 23 and the elastic member 24 sandwich the ball portion 12 in the cavity 20, the elastic members 24 are evenly distributed around the cavity 20 which is located above the opening 210.

To be emphasized, the elastic members 24 are not limited to one, two, three or more. On the one hand, if the elastic member 24 is not ring-shaped, at least two elastic members 24 are correspondingly received in the at least two receiving grooves 213 for making sure that the elastic members 24 provide balanced supporting force to the ball portion 12; on the other hand, the elastic member 24 can be only one if the elastic member 24 has a ring shape. The only one ring-shaped elastic member 24 can also provide balanced supporting force to the ball portion 12.

The universal joint of the present disclosure forms a cavity 20 commonly surrounded by the cover body 22 and the seat body 21, and the damping member 23 and the elastic member 24 are positioned on opposite sides of the cavity 20. The elastic member 24 is fixed on the seat body 21 and maintained below the cover body 22 while the damping member 23 is fixed on the cover body 22 and maintained above the seat body 21. Therefore, after the ball portion 12 is fully assembled into the cavity 20, the damping member 23 and the elastic member 24 interfere with the ball portion 12 in a manner of clamping along an up-and-down direction, and the universal joint of the present disclosure ensures an electronic product to rotate in all directions. Therefore, the universal joint is used for supporting an electronic product and omnidirectionally rotating the electronic product. The universal joint of the present disclosure is capable of displaying an electronic product in 360-degree omnidirectional rotation. The positioning and installation of the elastic member 24 is not restricted by the damping member 23, which avoids failure of the elastic member 24 caused by unstable positioning of the elastic member 24. The universal joint of the present disclosure has a stable structure.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the present disclosure, and all technical solutions and improvements that do not depart from the spirit and scope of the present disclosure should be covered by the claims of the present disclosure.

What is claimed is:

1. A universal joint, comprising:
   a seat body;
   a cover body;
   a damping member;
   at least one elastic member; and
   a base portion and a ball portion positioned on the base portion;
   wherein the cover body is fixed on the seat body, the cover body and the seat body form a cavity together, the damping member and the at least one elastic member are respectively located on opposite sides of the cavity, the at least one elastic member is fixed on the seat body and maintained below the cover body, and the damping member is fixed on the cover body and maintained above the seat body, the seat body comprises an upper surface facing the cover body and a lower surface facing the base portion, the seat body defines at least one receiving groove, the at least one receiving groove is formed by being recessed within the upper surface toward the lower surface, the at least one receiving groove is communicated with the cavity, the seat body comprises at least one side wall surface located beside the at least one receiving groove and at least one bottom wall surface located below the at least one receiving groove, enabling the at least one elastic member to be exposed in the cavity when the at least one elastic member is located in the at least one receiving groove and in a natural state.

2. The universal joint according to claim 1, wherein the seat body defines an opening for the ball portion to enter the cavity, the damping member and the at least one elastic member sandwich the ball portion in the cavity.

3. The universal joint according to claim 2, wherein an inner side of the at least one bottom wall surface is curved toward an outer side of the at least one bottom wall surface, such that the at least one bottom wall surface is shaped in a circular arc, the at least one side wall surface comprises two rib portion, and an avoiding space is defined between the rib portions for receiving the at least one elastic member when the at least one elastic member is deformed by the ball portion.

4. The universal joint according to claim 3, wherein the at least one elastic member comprises three elastic members, the at least one receiving groove comprises three receiving grooves, the at least one side wall surface comprises three side wall surfaces, and the at least one bottom wall surface comprises three bottom wall surfaces; and wherein the three bottom wall surfaces are located on a same height plane relative to the lower surface and extension lines of the three bottom wall surfaces form a regular triangle such that the three elastic members provide a three-point balanced supporting force to the ball portion.

5. The universal joint according to claim 4, wherein the seat body comprises three raised portions, each raised portion is respectively formed between adjacent ends of the receiving grooves, and the raised portions are configured for pre-positioning of the ball portion when the ball portion is assembled into cavity.

6. The universal joint according to claim 5, wherein the cover body comprises a hat portion and a brim portion, the hat portion extends upward from the brim portion, the hat portion comprises an end opening at a bottom face thereof and the brim portion extends outward from the end opening of the hat portion, the brim portion is installed on the upper surface of the seat body, the brim portion forms a plurality of stopping blocks, and the stopping blocks correspondingly press against the elastic members to prevent the elastic members from jumping out of the receiving grooves upwardly.

7. The universal joint according to claim 6, wherein the brim portion comprises a positioning post and a positioning rib, the seat body comprises a concaved portion facing the brim portion, the positioning post protrudes into the concaved portion for pre-positioning the seat body and the cover body; and wherein the positioning rib abuts against the upper surface of the seat body, such that at least one of the cover body and the seat body are capable of deforming the positioning rib, wherein when the positioning rib is deformed, it is configured to be welded so as to fix the seat body and the cover body as a whole.

8. The universal joint according to claim 6, wherein the hat portion comprises a top wall and an annular side wall, the top wall and the annular side wall enclose a receiving space, the damping member is a rubber element accommodated in the receiving space, the damping member comprises an arc surface and an annular wall portion formed on an outer periphery of the arc surface, and the arc surface is interferingly engaged with the ball portion.

9. The universal joint according to claim 8, wherein an outer surface of the annular wall portion is in contact with an inner wall surface of the annular side wall, and an outer face of the arc surface is capable of being in contact with an inner wall face of the top wall.

10. A universal joint, comprising:
a seat body;
a cover body fixed on the seat body;
a damping member;
at least one elastic member;
a base portion; and
a ball portion positioned on the base portion;
wherein the cover body and the seat body form a cavity together, the damping member and the at least one elastic member are respectively located on opposite sides of the cavity, the at least one elastic member is fixed on the seat body and the damping member is fixed on the cover body, the seat body defines an opening from which the ball portion is configured to enter into the cavity, the damping member frictionally presses against the ball portion and the ball portion is flexibly supported by the at least one elastic member, the seat body comprises an upper surface facing the cover body and a lower surface facing the base portion, the seat body defines at least one receiving groove, the at least one receiving groove is formed by being recessed within the upper surface toward the lower surface, the at least one receiving groove is communicated with the cavity, the seat body comprises at least one side wall surface located beside the at least one receiving groove and at least one bottom wall surface located below the at least one receiving groove, enabling the at least one elastic member to be exposed in the cavity when the at least one elastic member is located in the at least one receiving groove and in a natural state.

11. The universal joint according to claim 10, wherein an inner side of the at least one bottom wall surface is curved toward an outer side of the at least one bottom wall surface, such that the at least one bottom wall surface is shaped in a circular arc, the at least one side wall surface comprises two rib portions, and an avoiding space is defined between the rib portions for receiving the at least one elastic member when the at least one elastic member is deformed by the ball portion.

12. The universal joint according to claim 11, wherein the at least one elastic member comprises three elastic members, the at least one receiving groove comprises three receiving grooves, the at least one side wall surface comprises three side wall surfaces, and the at least one bottom wall surface comprises three bottom wall surfaces; and wherein the three bottom wall surfaces are located on a same height plane relative to the lower surface, and extension lines of the three bottom wall surfaces form a regular triangle, such that the three elastic members provide a three-point balanced supporting force to the ball portion.

13. The universal joint according to claim 12, wherein the seat body comprises three raised portions, each raised portion is respectively formed between adjacent ends of the receiving grooves, and the raised portions are configured for pre-positioning of the ball portion when the ball portion is assembled into cavity.

14. A universal joint, comprising:

a seat body;

a cover body fixed on the seat body;

a damping member;

a plurality of elastic members;

a base portion; and a ball portion positioned on the base portion;

wherein the cover body and the seat body form a cavity together, the damping member and the elastic members are respectively located on opposite sides of the cavity, the elastic members are fixed on the seat body and the damping member is fixed on the cover body, the seat body defines an opening from which the ball portion is configured to enter into the cavity, the damping member and the elastic members sandwich the ball portion in the cavity, the elastic members are evenly distributed around the cavity which is located above the opening, the seat body comprises an upper surface facing the cover body and a lower surface facing the base portion, the seat body defines a plurality of receiving grooves, each receiving groove is formed by being recessed from the upper surface toward the lower surface, each receiving groove is communicated with the cavity, the seat body comprises a plurality of side wall surfaces located beside the receiving grooves and a plurality of bottom wall surfaces located below the receiving grooves, enabling a corresponding elastic member of the elastic members to be exposed in the cavity when the corresponding elastic member of the elastic members is located in a corresponding receiving groove of the receiving grooves and in a natural state.

15. The universal joint according to claim 14, wherein the plurality of elastic members comprises three elastic members for providing a supporting force to the ball portion.

16. The universal joint according to claim 15, wherein the plurality of receiving grooves comprises three receiving grooves, each correspondingly receiving a respective one of the elastic members; and wherein the plurality of bottom wall surfaces comprises three bottom wall surfaces, each located below a respective one of the receiving grooves.

17. The universal joint according to claim 16, wherein the receiving grooves each have the same depth and wherein extension lines of the three bottom wall surfaces form a regular triangle, such that the three elastic members provide a three-point balanced supporting force to the ball portion.

18. The universal joint according to claim 16, wherein the seat body comprises three raised portions, each raised portion is respectively formed between adjacent ends of the receiving grooves, and the raised portions are configured for pre-positioning of the ball portion when the ball portion is assembled into the cavity.

* * * * *